United States Patent
Kim

(10) Patent No.: US 9,989,110 B2
(45) Date of Patent: Jun. 5, 2018

(54) METHOD FOR SEARCHING TOUCH POINT OF DCT CLUTCH

(71) Applicant: HYUNDAI AUTRON CO., LTD., Seongnam-si (KR)

(72) Inventor: Min-Hyo Kim, Gunpo-si (KR)

(73) Assignee: HYUNDAI AUTRON CO., LTD., Seongnam-si (KR)

(*) Notice: Subject to any disclaimer, the term of this patent is extended or adjusted under 35 U.S.C. 154(b) by 0 days. days.

(21) Appl. No.: 15/273,371

(22) Filed: Sep. 22, 2016

(65) Prior Publication Data
US 2017/0082156 A1    Mar. 23, 2017

(30) Foreign Application Priority Data
Sep. 23, 2015  (KR) .................. 10-2015-0134625

(51) Int. Cl.
*F16D 48/06* (2006.01)
*F16D 48/08* (2006.01)
*F16D 13/38* (2006.01)

(52) U.S. Cl.
CPC ............ *F16D 48/08* (2013.01); *F16D 48/06* (2013.01); *F16D 13/385* (2013.01); *F16D 2500/10412* (2013.01); *F16D 2500/304* (2013.01); *F16D 2500/3026* (2013.01); *F16D 2500/3068* (2013.01); *F16D 2500/30401* (2013.01); *F16D 2500/30404* (2013.01); *F16D 2500/30407* (2013.01); *F16D 2500/30428* (2013.01); *F16D 2500/5012* (2013.01); *F16D 2500/50245* (2013.01); *F16D 2500/50251* (2013.01); *F16D 2500/50257* (2013.01); *F16D 2500/50284* (2013.01); *F16D 2500/7041* (2013.01); *F16D 2500/70458* (2013.01)

(58) Field of Classification Search
CPC . F16D 48/06; F16D 48/08; F16D 2500/10412
See application file for complete search history.

(56) References Cited

U.S. PATENT DOCUMENTS 5,314,050 A * 5/1994 Slicker .................. B60W 10/02
                                                              477/171
5,441,462 A * 8/1995 Chan ..................... B60W 10/02
                                                              477/74

(Continued)

FOREIGN PATENT DOCUMENTS

| JP | 2011-161982 A | 8/2011 |
|---|---|---|
| KR | 10-2014-0060012 A | 5/2014 |
| WO | WO 2004/076225 A1 | 9/2004 |

*Primary Examiner* — Edwin A Young
(74) *Attorney, Agent, or Firm* — Morgan, Lewis & Bockius LLP

(57) ABSTRACT

The present invention provides a method for searching a touch point of a clutch in a dual clutch transmission, including: (a) a step of checking whether a touch point searching condition for a non-driving clutch and a driving clutch is met or not; (b) when the search condition of the step (a) is met, a step of detecting a searching point at which an absolute value of a difference between an acceleration value of an engine and an acceleration value of the driving clutch is larger than a threshold value after applying a position value of the non-driving clutch to the engine; and (c) a step of determining a position of the non-driving clutch corresponding to the searching point as the touch point.

4 Claims, 2 Drawing Sheets

(56) References Cited

U.S. PATENT DOCUMENTS

| | | | |
|---|---|---|---|
| 2004/0087414 A1* | 5/2004 | Markyvech | F02D 9/02 477/90 |
| 2004/0147367 A1 | 7/2004 | Rieger et al. | |
| 2014/0136066 A1* | 5/2014 | Cho | F16D 48/06 701/68 |

* cited by examiner

METHOD FOR SEARCHING TOUCH POINT OF DCT CLUTCH

CROSS REFERENCE TO RELATED APPLICATION

This application claims the benefit of Korean Patent Application No. 10-2015-0134625, filed on Sep. 23, 2015, entitled "METHOD FOR SEARCHING TOUCH POINT OF DCT CLUTCH", which is hereby incorporated by reference in its entirety into this application.

BACKGROUND

Technical Field

The present invention relates to a method for searching a touch point of a DCT clutch.

Description of the Related Art

In the transmission system where a power from an engine is transferred through a clutch, a control is generally made based on a TS (torque-stroke) characteristic graph (hereinafter, referred as "TS curve") showing a change in a clutch torque for a clutch position (stroke). Thus, in order to perform highly reliable control, the TS curve should be learned which is changed in accordance with a control environment (clutch temperature, etc.).

In the TS curve, a touch point functions as a control element and has an important meaning as the starting point of the TS curve that transfers the power of the engine to the clutch by making a clutch plate and an engine plate come in contact with each other.

A DCT (dual clutch transmission) is designed to learn the TS curve through the periodic study about the touch point of the clutch shaft which is not driven between two clutches.

In other words, since the DCT is provided with a clutch which is capable of disconnecting a power automatically by an actuator and, in the case of using a dry type clutch, the touch point as an operation starting point of the clutch is changed due to, e.g., temperature change or abrasion of the clutch, the proper study for the touch point is necessary in order to ensure the stable operability of the clutch.

Conventional touch point search was typically done based on the velocity change value of a neutral shaft made at the time when the clutch is applied after confirming the gear neutral condition of a non-drive shaft.

However, the dual clutch transmission (DCT) has an advantage that a next transmission is prepared by engaging a gear in advance with the clutch which is not currently driven. However, in a state where a gear is engaged with a clutch in advance, it is impossible to search for a touch point in a conventional way and a control quality cannot be guaranteed at the next transmission when the state is continued.

SUMMARY

It is an aspect of the present invention to provide a method for searching a touch point of a clutch, and more particularly, to a method for searching a touch point of a clutch that enables to search a touch point by applying the clutch position of the non-drive shaft when the drive shaft is slip controlled in the state of jointing of the non-drive shaft gear.

It should be noted that objects of the present invention are not limited to the aforementioned object, and other objects of the present invention will be apparent to those skilled in the art from the following descriptions. In addition, it will be appreciated that the objects and advantages of the present invention can be implemented by means recited in the appended claims and the combination thereof.

In accordance with an aspect of the present invention, there is provided a method for searching a touch point of a clutch in a dual clutch transmission, including: (a) a step of checking whether a touch point searching condition for a non-driving clutch and a driving clutch is met or not; (b) when the search condition of the step (a) is met, a step of detecting a searching point at which an absolute value of a difference between an acceleration value of an engine and an acceleration value of the driving clutch is larger than a threshold value after applying a position value of the non-driving clutch to the engine; and (c) a step of determining a position of the non-driving clutch corresponding to the searching point as the touch point.

In the step (c), the touch point may be determined by adding an offset compensation value corresponding to a torque of the engine to the position of the non-driving clutch corresponding to the searching point.

In the step (a), when the non-driving clutch is in gear and the driving clutch is in a slip control state, the touch point searching condition may be met.

In the step (b), searching the touch point may be stopped when there is no change in the acceleration value of the engine in spite of applying the position value of the non-driving clutch to the engine.

DETAILED DESCRIPTION

Figure 1:
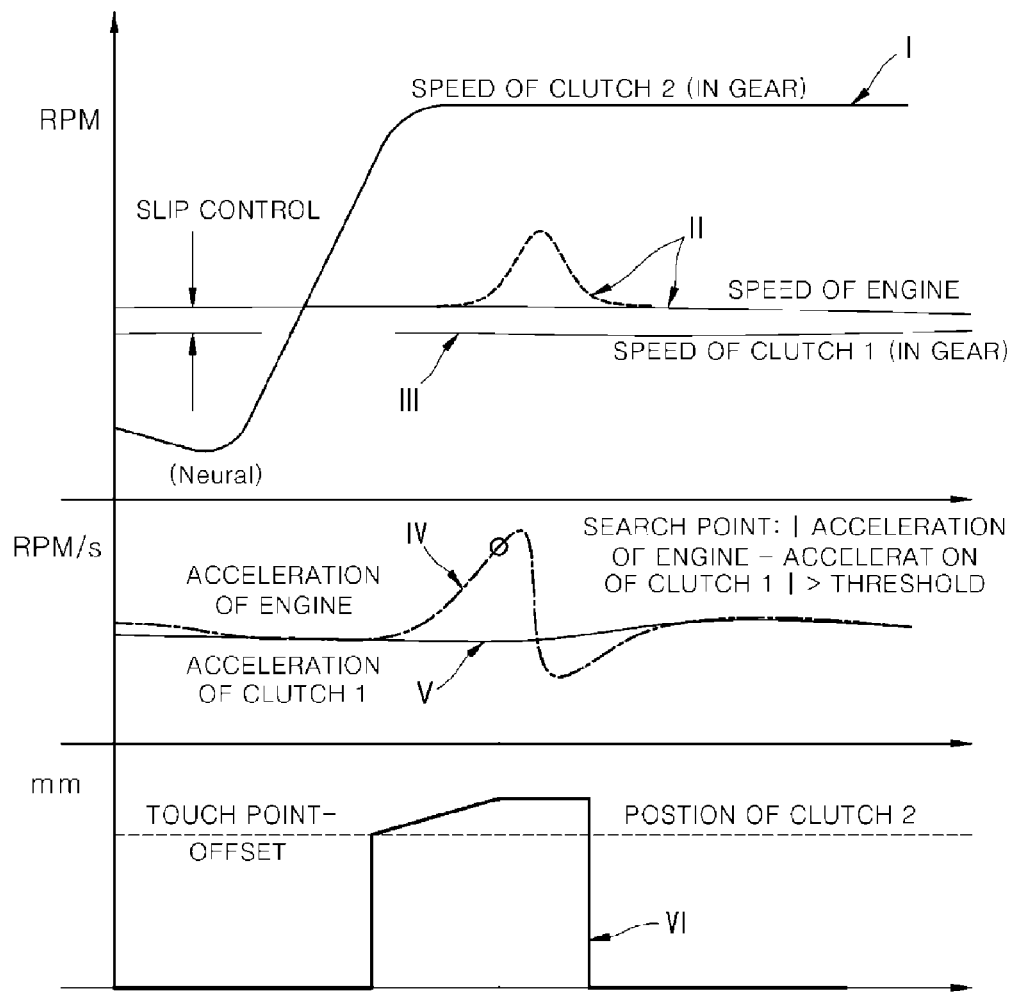
FIG. 1 is an operation graph for explaining a method for searching a touch point of a DCT clutch in accordance with an embodiment of the present invention.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 is an operation graph illustrating a method for searching a touch point of a DCT clutch in accordance with an embodiment of the present invention.

Clutches are separated into a driving clutch (clutch 1) receiving a power from an engine and a non-driving clutch (clutch 2) disconnected from the power of the engine in normal driving conditions. In this case, the non-driving clutch rotates by the gear ratio according to the speed of the vehicle through engaging in advance with the anticipated next gear stage.

In the present invention, in order to search the touch point for a gear engaged non-driving clutch shaft, a new method would be proposed that uses slip variations of an engine and a driving shaft by applying a torque of the non-driving clutch to the engine when operating the driving clutch in a torque similar to a torque of the engine through a slip control of the driving clutch.

In other words, as shown in FIG. 1, a RPM (revolutions per minute) (I) is increased as the neutral non-driving clutch (clutch 2) becomes in gear. In addition, it can be found that the torque (II) of the engine and the torque (III) of the driving clutch has a similar position value because the driving clutch (clutch 1) receiving the power from the engine is in the slip control state.

In a state that such search conditions are met, that is, in a state that the driving clutch is slip controlled and the non-driving clutch is in gear, when the torque (position value) of the non-driving clutch is applied to the engine, i.e., when position values of the non-driving clutch changing from the neutral state to the in-gear state are applied to the engine, it can be found that the instantaneous change occurs in an acceleration value (IV) of the engine. In addition, through the drawings, it can be confirmed that using the information of changes generated in this manner enables to search the touch point of the non-driving clutch.

In other words, a position (VI) of the non-driving clutch can be determined as the touch point at the moment when a difference between the engine acceleration value (IV) which is caused by applying the position value of the non-driving clutch to the engine and an acceleration value (V) of the driving clutch which maintains a constant level in a slip control state, i.e., at the moment when the absolute value of the difference between the engine acceleration value (IV) and the acceleration value (V) of the driving clutch 1, exceeds a threshold (see, a vertical dotted line in FIG. 1).

Figure 2:
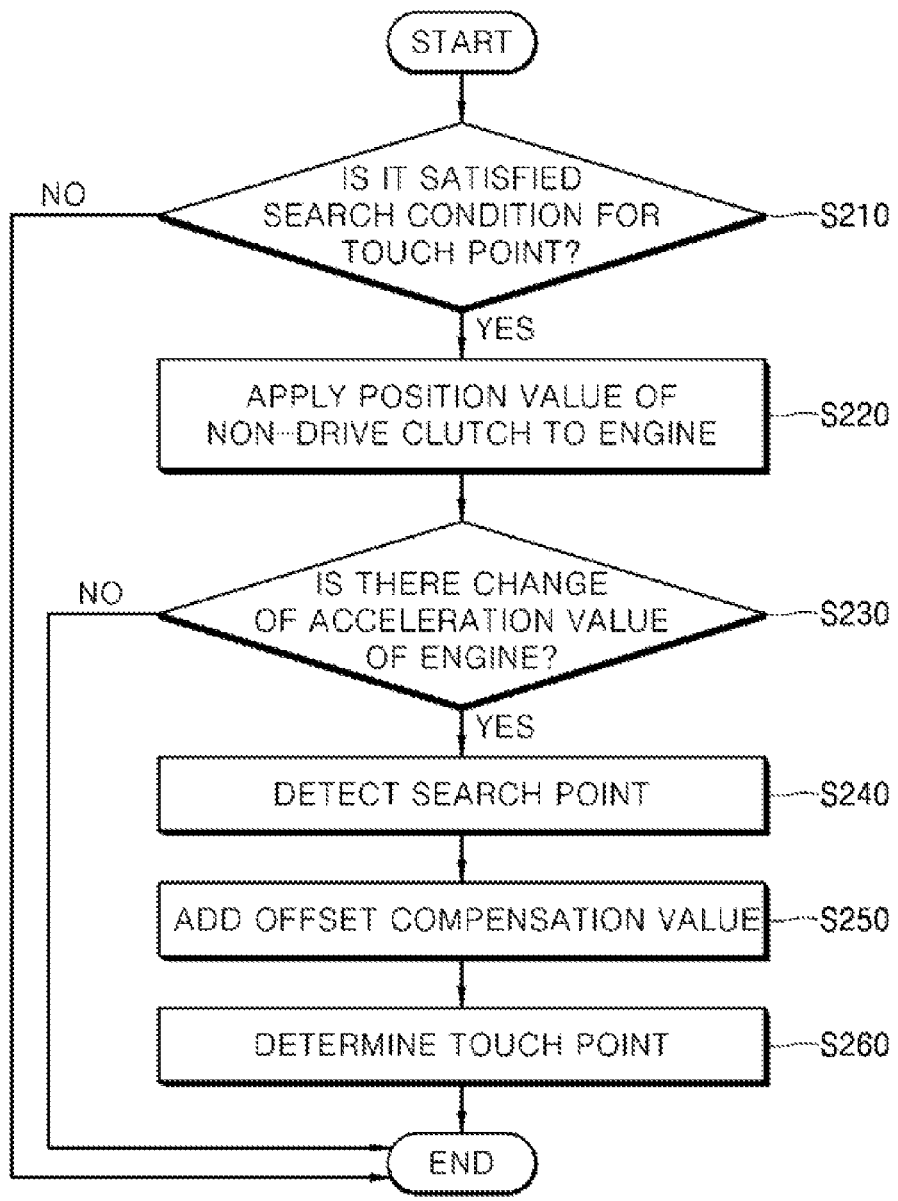
FIG. 2 is a flowchart illustrating a method for searching the touch point of the DCT clutch in accordance with the embodiment of the present invention.

At this time, for determining the touch point more accurately, it is preferable to compensate the touch point with adding a touch point-offset (indicated as a horizontal dotted line in FIG. 1) corresponding to the torque of the engine FIG. 2 is a flowchart illustrating the method for searching the touch point of the DCT clutch in accordance with the embodiment of the present invention.

Referring to FIG. 2, the method for searching the touch point of the DCT clutch in accordance with the embodiment of the present invention includes a step S210 of checking whether the condition for searching the touch point is met or not, a step S220 of applying the position value of a non-driving clutch to the engine, a step S240 of detecting a searching point and so on.

The step S210 of checking whether the condition for searching the touch point is met or not may be realized in two detailed processes of checking that the driving clutch is slip controlled and the non-driving clutch is in gear.

If it is determined that the touch point search condition is met in the step S210, the step S220 of applying the position value of the non-driving clutch to the engine is performed. It is, although previously described, the process for producing a change in the acceleration value of the engine by applying the position values of the non-driving gear changing from the neutral state to the in-gear state to the engine.

When the position value of the non-driving clutch is applied to the engine in the step S220, and thus, when a change in the acceleration value of the engine occurs in the S230, the step S240 for detecting a searching point can be performed.

The searching point is a point at which the absolute value of the difference between the acceleration value of the engine and the acceleration value of the driving clutch exceeds a threshold (reference value). That is, the searching point meets the relationship [|(acceleration value of the engine)−(acceleration value of the driving clutch)|>threshold].

A position of the non-driving clutch corresponding to the searching point detected in the searching point detecting step S240 may be determined as the touch point of the non-driving clutch. However, it may further include a compensation step S250 in which the position of the non-driving clutch corresponding to the detected searching point compensated with adding a touch point-offset corresponding to the torque of the engine. In the step S260, it is preferable to determine the touch point more accurately through the compensation step S250.

Here, when it is determined that the condition is not met in the step S210 of determining whether the condition for searching the touch point is met or not, in other words, when the driving clutch is not slip controlled or the non-driving clutch is not in gear, the process of searching a touch point for the driving clutch may stop as shown in FIG. 1.

In addition, it may be configured for the process of searching a touch point not to be in progress any longer when there is no change in the acceleration value of the engine (S230) in spite of applying the position value of the non-driving clutch to the engine (S220).

That is, interlock may occur if the position value of the clutch reaches a predetermined maximum value in the absence of changes in the acceleration value of the engine despite applying the position value of the non-driving clutch to the engine. Thus, in the present invention, searching a touch point can be stopped by an additional process as described above.

As described above, the present invention provides the method for searching the touch point of the clutch in which the touch point is detected by applying the position value of the non-driving clutch to the engine when the driving shaft is slip controlled and the non-driving shaft is in gear state.

And through this, by increasing the chance of learning the touch point through searching the touch point for the non-driving clutch, as a result, the reliability of a TS curve can be improved. Accordingly, it is possible to provide a variety of effects such as maximizing the advantage of the DCT that, when shifting speed, the fast transmission can be carried out simply through changing the clutch torque by engaging in advance the clutch with the gear.

According to the present invention as described above, there is an advantage that the reliability of a TS curve can be improved because the chance of learning a clutch touch point increases by searching the clutch touch point for a gear engaged non-drive shaft as well when searching the clutch touch point.

Accordingly, it is possible to enhance the advantage of the DCT that, when shifting speed, the fast transmission can be carried out simply through changing the clutch torque by engaging in advance the clutch with the gear.

Those skilled in the art will appreciate that various substitutions, modifications, variations can be made to the present invention without departing from the technical spirit of the invention and that the present invention is not limited to the embodiments described above and the accompanying drawings.

What is claimed is:

1. A method for searching a touch point of a clutch in a dual clutch transmission, comprising:

(a) a step of checking, by a controller, whether a touch point searching condition for a non-driving clutch and a driving clutch is met;

(b) when the searching condition of the step (a) is met, a step of detecting, by the controller, a searching point at which an absolute value of a difference between an acceleration value of an engine and an acceleration value of the driving clutch is larger than a threshold value after applying a torque of the non-driving clutch to the engine;

(c) a step of determining, by the controller, a position of the non-driving clutch corresponding to the searching point as the touch point; and (d) engaging, by the controller, the driving clutch and the non-driving clutch according to the detected position of the non-driving clutch.

2. The method of claim 1, wherein, in the step (c), the touch point is determined by adding an offset compensation value corresponding to a torque of the engine to the position of the non-driving clutch corresponding to the searching point.

3. The method of claim 1, wherein, in the step (a), when the non-driving clutch is engaged with the driving clutch in a slip control state, the touch point searching condition is met.

4. The method of claim 3, wherein, in the step (b), searching the touch point is stopped when there is no change in the acceleration value of the engine in spite of applying the torque of the non-driving clutch to the engine.

\* \* \* \* \*